(12) United States Patent
Graham

(10) Patent No.: US 12,091,332 B2
(45) Date of Patent: Sep. 17, 2024

(54) APPARATUS AND METHOD FOR MODIFYING A SPRAYER BOTTLE INTO AN OZONATING SPRAYER BOTTLE AND FOR MAKING A WATER RESERVOIR INTO AN OZONATED WATER RESERVOIR

(71) Applicant: Professional Server Certification Corporation, Madison, SD (US)

(72) Inventor: Robert V. Graham, Wentworth, SD (US)

(73) Assignee: Professional Server Certification Corporation, Madison, SD (US)

( * ) Notice: Subject to any disclaimer, the term of this patent is extended or adjusted under 35 U.S.C. 154(b) by 723 days.

(21) Appl. No.: 17/190,731

(22) Filed: Mar. 3, 2021

(65) Prior Publication Data

US 2022/0194821 A1 Jun. 23, 2022

Related U.S. Application Data

(63) Continuation-in-part of application No. 17/129,196, filed on Dec. 21, 2020, now Pat. No. 10,973,938.

(51) Int. Cl.
*C02F 1/461* (2023.01)
*B08B 3/10* (2006.01)
(Continued)

(52) U.S. Cl.
CPC ............ *C02F 1/46104* (2013.01); *B08B 3/10* (2013.01); *C02F 1/008* (2013.01); *C02F 1/4672* (2013.01);
(Continued)

(58) Field of Classification Search
CPC .... C02F 1/46104; C02F 1/008; C02F 1/4672; C02F 2201/46125; C02F 2201/4615;
(Continued)

(56) References Cited

U.S. PATENT DOCUMENTS 9,079,227 B2 7/2015 Barnes
9,540,259 B2 1/2017 Lutz et al.
(Continued)

FOREIGN PATENT DOCUMENTS

CN 111214684 A 6/2020
CN 211865528 U 11/2020
(Continued)

OTHER PUBLICATIONS

English abstract of KR20190003057A.
(Continued)

*Primary Examiner* — Xiuyu Tai
(74) *Attorney, Agent, or Firm* — Caesar Rivise, PC

(57) ABSTRACT

An apparatus that can be connected to a conventional sprayer bottle that permits the sprayer bottle to generate ozonated water to be used as a cleaning fluid. The apparatus includes an ozonator element coupled at one end of an electrical cable and an electrical connector coupled at the other end of the electrical cable. An aperture is formed in the sidewall of the bottle and the ozonator element, electrical cable and connector are passed through a top opening in the bottle portion. The electrical connector is then releasably secured within the aperture with the ozonator element being submerged in the water contained within the bottle. The dip tube of the spray head is then passed through the top opening and into the water in the bottle and the spray head is secured onto the bottle. Electrical energy is provided through the connector to the ozonator element to ozonate the water in the bottle for predetermined period of time after which the sprayer bottle contains ozonated water for cleaning. After another predetermined period of time, the ozonator element is energized again to ensure ozonated water is always available. A related apparatus can be connected between a (Continued)

feedpipe and a water reservoir for making the reservoir an ozonating water source.

10 Claims, 13 Drawing Sheets

(51) Int. Cl.
*C02F 1/00* (2023.01)
*C02F 1/467* (2023.01)

(52) U.S. Cl.
CPC .......... *C02F 2201/46125* (2013.01); *C02F 2201/4615* (2013.01); *C02F 2201/4618* (2013.01); *C02F 2201/782* (2013.01); *C02F 2303/04* (2013.01); *C02F 2307/02* (2013.01)

(58) Field of Classification Search
CPC ........ C02F 2201/4618; C02F 2201/782; C02F 2303/04; C02F 2307/02; B08B 3/10
See application file for complete search history.

(56) References Cited

U.S. PATENT DOCUMENTS

| | | | |
|---|---|---|---|
| 9,636,715 | B1 | 5/2017 | Barnes |
| 10,413,925 | B2 | 9/2019 | Gonzalez et al. |
| 10,610,902 | B1 | 4/2020 | Brook et al. |
| 10,973,938 | B1 | 4/2021 | Graham |
| 2007/0023273 | A1 | 2/2007 | Kitaori et al. |
| 2009/0039033 | A1 | 2/2009 | Kee et al. |
| 2013/0277211 | A1 | 10/2013 | Joshi et al. |
| 2016/0097132 | A1 | 4/2016 | Joshi et al. |
| 2017/0137953 | A1* | 5/2017 | Jonte .......... C25B 1/13 |

FOREIGN PATENT DOCUMENTS

| | | |
|---|---|---|
| CN | 211914361 U | 11/2020 |
| KR | 20170011173 A | 2/2017 |
| KR | 20170063361 A | 6/2017 |
| KR | 20190003057 A | 1/2019 |
| WO | WO 2013/154914 | 10/2013 |

OTHER PUBLICATIONS

International Search Report for related PCT Application No. PCT/US2021/062789 dated Apr. 20, 2022.

"2020 new innovated Portable USB Electrolytic Ozone Generator active oxygen water", Alibaba.com, retrieved from: https://www.alibaba.com/product-detail/2020-new-innovated-Portable-USB-Electrolytic_1700000972371.html?spm=a2700.galleryofferlist.normal_offer.d_image.6e7e31fcPCwZUf, (Video Submission), retrieved on Dec. 21, 2020.

"Timer Relay, DROK Time Delay Relay DC 5V 12V 24V Delay Controller Board Delay-off Cycle Timer 0.01s-9999mins Trigger Delay Switching Relay Module with LCD Display Support Micro USB 5V Power Supply", Amazon.com, retrieved from: https://www.amazon.com/gp/product/B07DFT2WDS/ref=ox_sc_act_title_1?smid=AFHAE9RJVUMB&psc=1, retrieved on Dec. 21, 2020.

"Electrolytic Ozone Generator", Alibaba.com, retrieved from: https://mac-verin.en.alibaba.com/, retrieved on Dec. 21, 2020.

* cited by examiner

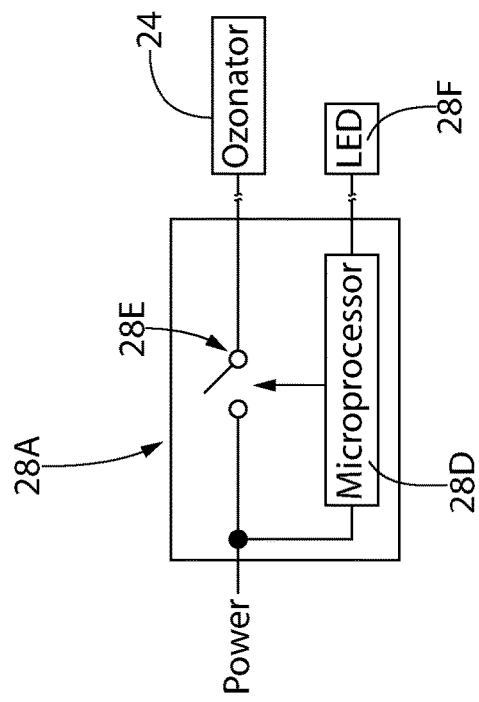
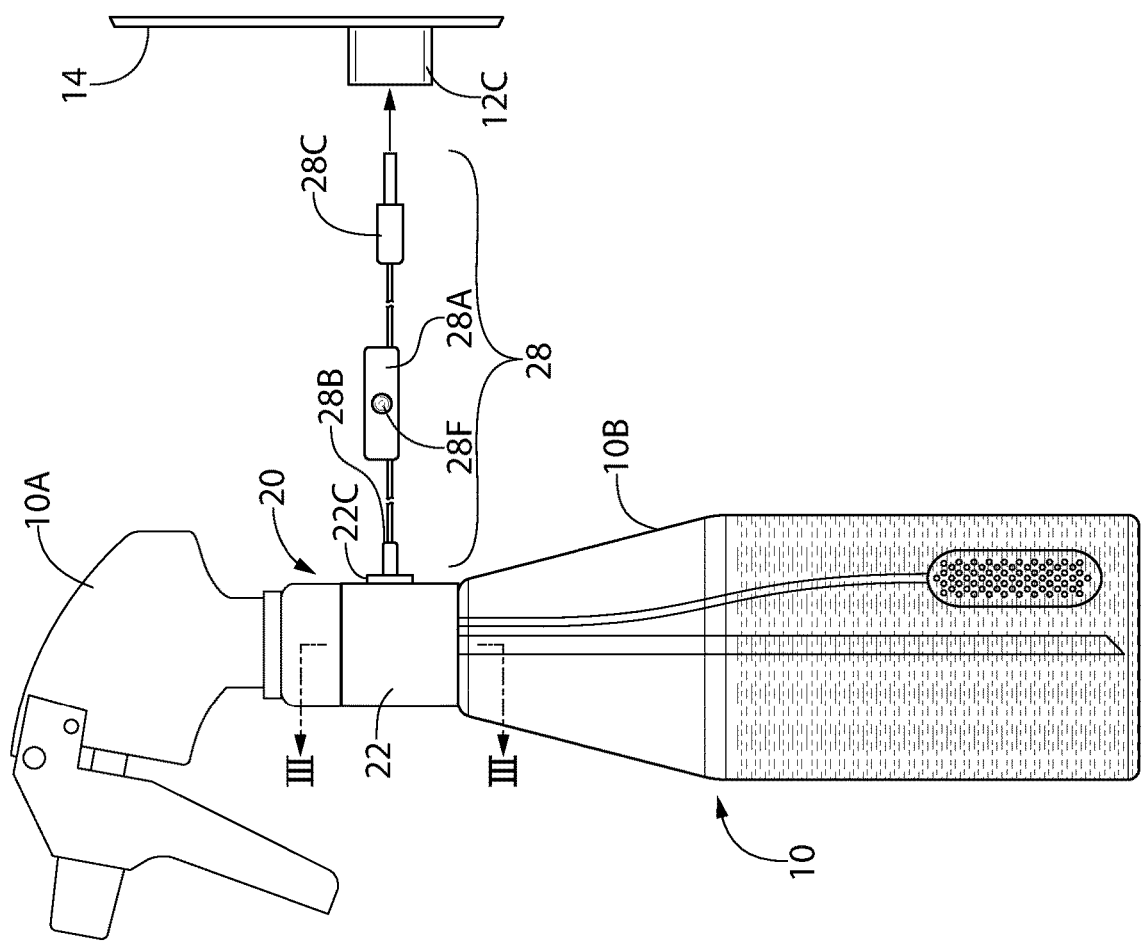
FIG. 2A
FIG. 2

APPARATUS AND METHOD FOR MODIFYING A SPRAYER BOTTLE INTO AN OZONATING SPRAYER BOTTLE AND FOR MAKING A WATER RESERVOIR INTO AN OZONATED WATER RESERVOIR

CROSS-REFERENCE TO RELATED APPLICATIONS

This Continuation-in-Part application claims the benefit under 35 U.S.C. § 120 of application Ser. No. 17/129,196 filed on Dec. 21, 2020 entitled INSERT FOR SPRAYER BOTTLE FOR OZONATING WATER and whose entire disclosure is incorporated by reference herein.

BACKGROUND OF THE INVENTION

The present invention relates to relates generally to cleaning products that generate ozonated water and, more particularly, to an assembly that can be inserted into conventional spraying bottles for producing ozonated water.

The use of ozone ($O_3$) in different forms for sanitization is well-known. As a gas, ozone can be used for destroying mold or allergens but must be carefully administered because those levels of gaseous ozone can also be toxic to small children, pets and plants. However, when used in water, such ozonated water can be used to safely disinfect items or surfaces; in fact, ozonated water can even be ingested safely; for example, ozonated water is used by campers to clean water by destroying bacteria and other undesired content therein.

Devices that generate ozone are known as "ozonizers". Conventional ozonizers typically utilize electricity, or exposure to ultraviolet radiation, to convert oxygen ($O_2$) to ozone ($O_3$). The following U.S. patent references show examples of devices utilizing ozonated water. U.S. Pat. No. 9,079,227 (Barnes); U.S. Pat. No. 9,636,715 (Barnes); U.S. Pat. No. 9,540,259 (Lutz, et al.); U.S. Pat. No. 10,610,902 (Brook, et al.); U.S. Patent Publication Nos. 2013/0277211 (Joshi, et al.), now abandoned; and 2016/0097132 (Joshi, et al.), now abandoned.

While the devices disclosed in the aforementioned publications may be generally suitable for their intended purposes, these devices do not provide for convenient method of converting a conventional spray bottle into spray bottle of ozonated water. Thus, there remains a need for an insert that can be easily connected to a conventional spray bottle for generating ozonated water to act as a cleaning fluid, or for use as potable water. Moreover, there remains a need for easily making a water reservoir (e.g., a water tank) an ozonating source of water, for example, a potable water source.

All references cited herein are incorporated herein by reference in their entireties.

BRIEF SUMMARY OF THE INVENTION

An apparatus for permitting a conventional spray bottle to generate ozonated water and wherein the conventional spray bottle has a spray head and bottle portion, is disclosed. The apparatus comprises: an electrical connector positioned in an aperture in a sidewall of the bottle portion; an ozonator element that is coupled to the electrical connector via an electrical cable and wherein the ozonator element is configured to be submerged within water contained within the bottle portion; and wherein the electrical connector conveys electrical power to the ozonator element to activate the ozonator element to ozonate the water contained with the bottle portion.

A method of ozonating water in a conventional spray bottle having a spray head with a dip tube and a bottle portion having a top opening is disclosed. The method comprises: forming an aperture in a sidewall of the bottle portion; providing an electrical connector having a first end electrically connected to an ozonator element via an electrical cable; passing the ozonator element and the electrical cable through the top opening and into the interior of the bottle portion; securing the electrical connector within the sidewall with the first end of the electrical connector being located within the interior portion of bottle portion and a second end, opposite the first end, of the electrical connector being positioned on an exterior side of the sidewall; disposing water into the bottle portion through the top opening; inserting the dip tube through the top opening and into the bottle portion and releasably securing the spray head to the bottle portion; and coupling a power cord to the second end of the connector to apply electrical power through the connector to activate the ozonator element for a first predetermined period of time to ozonate the water in the bottle portion.

An apparatus for permitting a water reservoir to provide ozonated water (e.g., forming a potable water source, a cleaning water source, etc.) and wherein the water reservoir has an input connector coupled to a feedline and an output is disclosed. The apparatus comprises: a coupler that can be releasably coupled between the feedline and the input connector, wherein the coupler comprises an electrical connector positioned in an aperture in a sidewall of the coupler; an ozonator element that is coupled to the electrical connector via an electrical cable and wherein the ozonator element is configured to be submerged within water contained within the water reservoir; and wherein the electrical connector conveys electrical power to the ozonator element to activate the ozonator element to ozonate the water contained with the water reservoir.

A method of ozonating water in a water reservoir (e.g., to form a potable water source, a cleaning water source, etc.) wherein the water reservoir has an input connector coupled to a feedline and an output is disclosed. The method comprises: forming an aperture in a sidewall of a coupler that configured to be releasably secured between the feedline and the input connector; providing an electrical connector having a first end electrically connected to an ozonator element via an electrical cable; securing the electrical connector within the sidewall with the first end of the electrical connector being located within the interior portion of the water reservoir and a second end, opposite the first end, of the electrical connector being positioned on an exterior side of the sidewall; disposing water into the water reservoir through the input connector such that the ozonator element is submerged in the water; connecting a first end of the coupler to the input connector and connecting a second end, opposite the first end, of the coupler to the feedline; and coupling a power cord to the second end of the connector to apply electrical power through the connector to activate the ozonator element for a first predetermined period of time to ozonate the water in the water reservoir.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 depicts the insert assembly of the present invention installed in a conventional spray bottle with a power cord coupled to the insert for energizing the ozonator element;

FIG. 2A is a schematic of the electronics of the present invention;

FIG. 9A is a schematic of the electronics of the alternative apparatus;

DETAILED DESCRIPTION OF THE PREFERRED EMBODIMENTS

Figure 1:
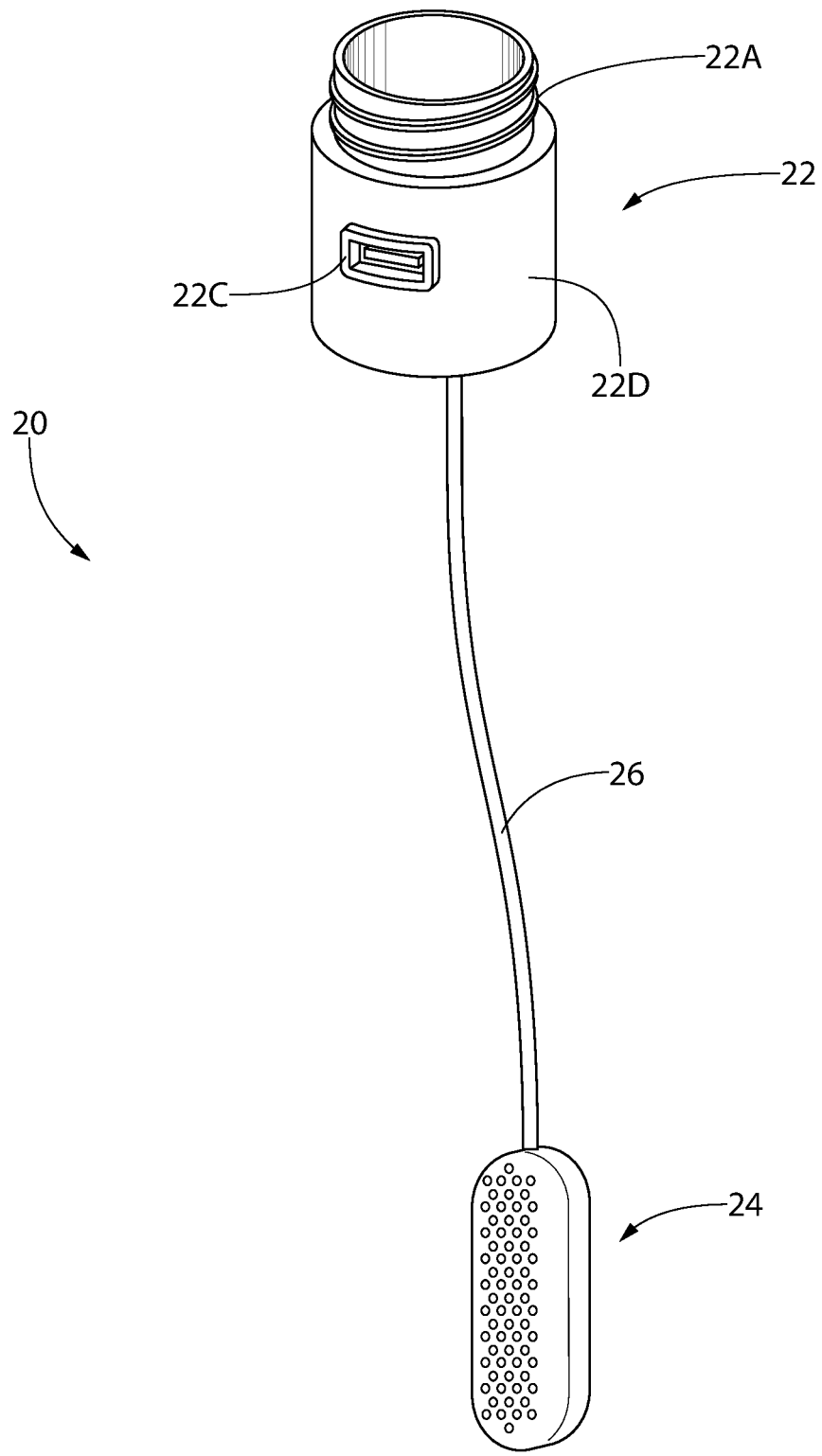
FIG. 1 depicts the insert assembly of the present invention.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 3:
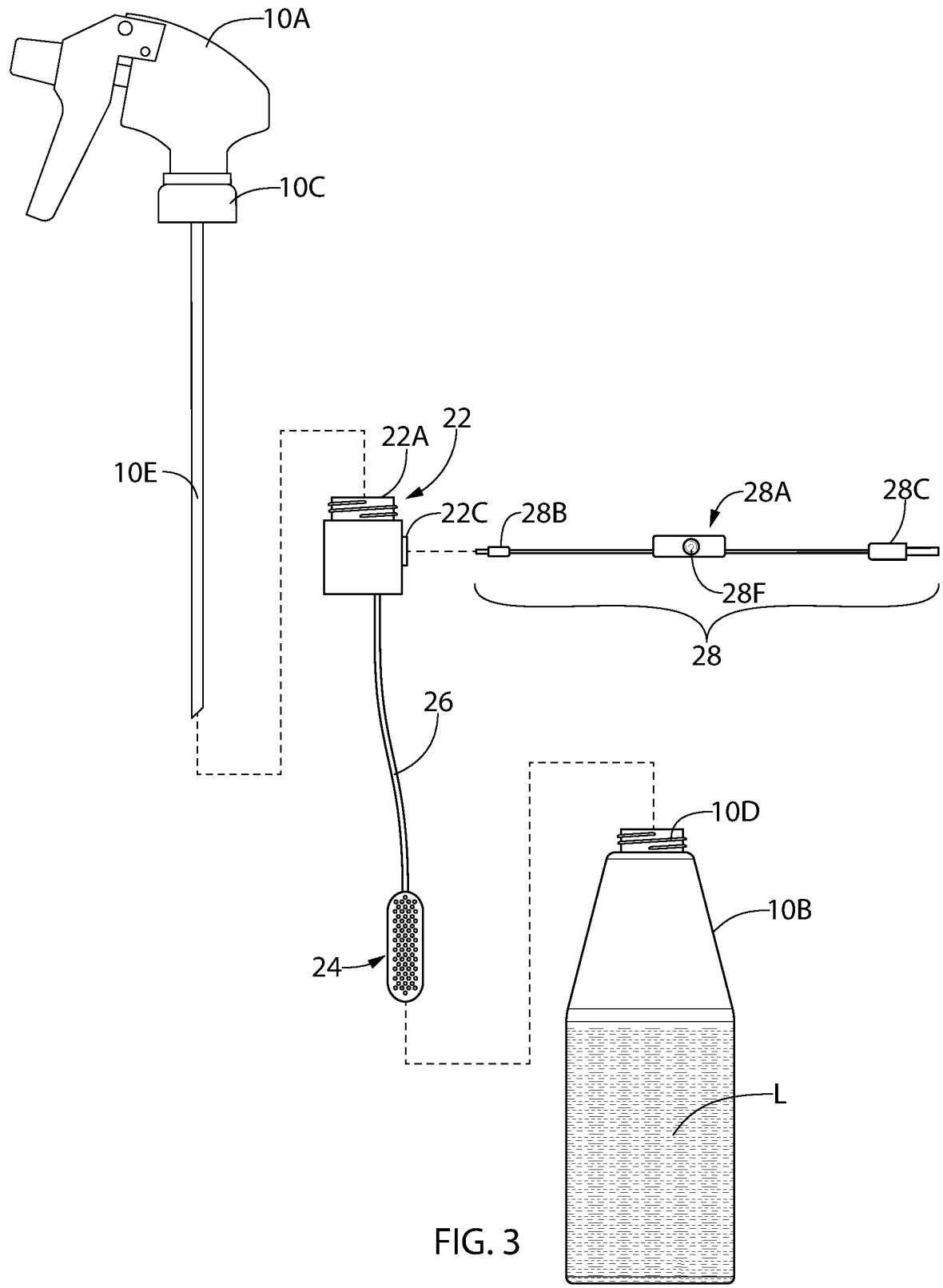
FIG. 3 is an exploded view of the present invention installed in a conventional spray bottle along with the power cord.

FIG. 1 depicts the insert assembly 20 of the present invention which comprises an insert member 22 and an ozonator element 24 (e.g., a portable electrolytic ozone generator such as the Moreclean Electrolyzed Ozone Generator sold by Alibaba.com) that is coupled to the insert member 22 via an electrical cable 26. The insert member 22 comprises an upper thread 22A (e.g., a threaded male connector) for engaging a corresponding threaded collar 10C in a spray head 10A of a conventional spray bottle 10 (FIGS. 2-3). The insert member 22 also comprises a lower thread 22B (e.g., a threaded female connector, see FIG. 3) for engaging a corresponding thread 10D on the top of a bottle portion 10B of the conventional spray bottle 10. The insert member 22 further comprises an electrical connector 22C (e.g., a USB receptacle) in a sidewall 22D of the insert member 22. To the internal side 22E of the electrical connector 22C is fixedly secured a first end of the electrical cable 26 for powering the ozonator element 24 coupled at the other end of electrical cable 26.

Figure 4:
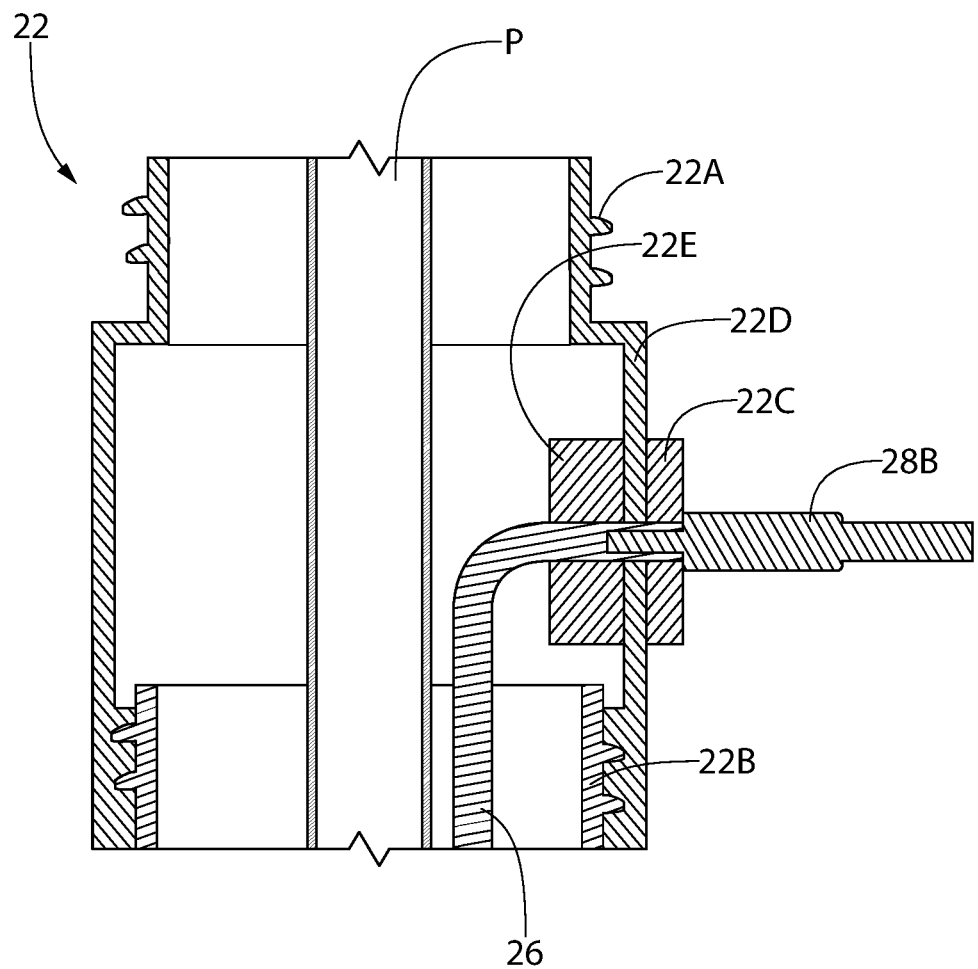
FIG. 4 is a cross-sectional view of the insert member taken along line of FIG. 2.

As can be seen from FIG. 4, the insert member 22 basically forms a passageway P to allow the spray head dip tube 10E (FIG. 3) to easily pass therethrough and into the water L in the bottle portion 10B, as well as allowing the ozonator element 24 to be suspended inside the water L in the bottle portion 10B. (See FIG. 2). As such, the internal volume of the insert member 22 provides sufficient space or passageway for the dip tube 10E and the electrical cable 26 to pass easily into the opening to the bottle portion 10B. The insert member 22A may comprise a durable plastic material, e.g., PVC or ABS.

As mentioned previously, the ozonator element 24 may comprise a commercially-available portable electrolytic ozone generator. This ozonator element 24 draws very little electrical current and, as such, it is safe to use while it is submerged in the water L (e.g., tap water). To ozonate the water in the bottle portion 10B, the ozonator element 24 need only be activated for a relatively short period of time, e.g., two minutes. This activation period (AP) may vary depending on the purity of the water. Once the ozonator element 24 is activated for the predetermined AP, the water L in the bottle portion 10B is "ozonated" and is ready for use as a cleaning or sanitizing agent (or potable water). Once "ozonated", the water L in the bottle portion 10B will remain "ozonated" for approximately two hours. After that time, the ozonated state of the water L will return to its pre-ozonated state and will need to be "re-ozonated" to form a cleaning agent (or potable water) again. Although this "effective use period" (EUP) may vary, two hours is a reliable time for using the ozonated water as a cleaning agent before the water L requires re-ozonation.

One of the key aspects of the present invention 20 is to provide a "ready-to-use" ozonated cleaning product in a conventional spray bottle 10. This is accomplished by electronics associated with the insert assembly 20. In one embodiment, a power cord 28 is also provided that includes a controller 28A, a first USB connector 28B and a second USB connector 28C. The first USB connector 28B connects to the electrical connector 22C in the insert member 22 while the second USB connector 28C connects to a conventional USB wall plug converter 12 which is inserted into a conventional wall power outlet 14. As shown most clearly in FIG. 2A, the controller 28A comprises a microprocessor 28D (e.g., microcontroller such as Microchip ATTINY 4-MAHR etc.), a switch 28E (e.g., a solid-state switch, e.g., NPN, transistor, etc.) and an indicator 28F (e.g., a light-emitting diode (LED), e.g., a Cree Inc. C512A-WNN-CZ0B0151 LED).

Figure 5:
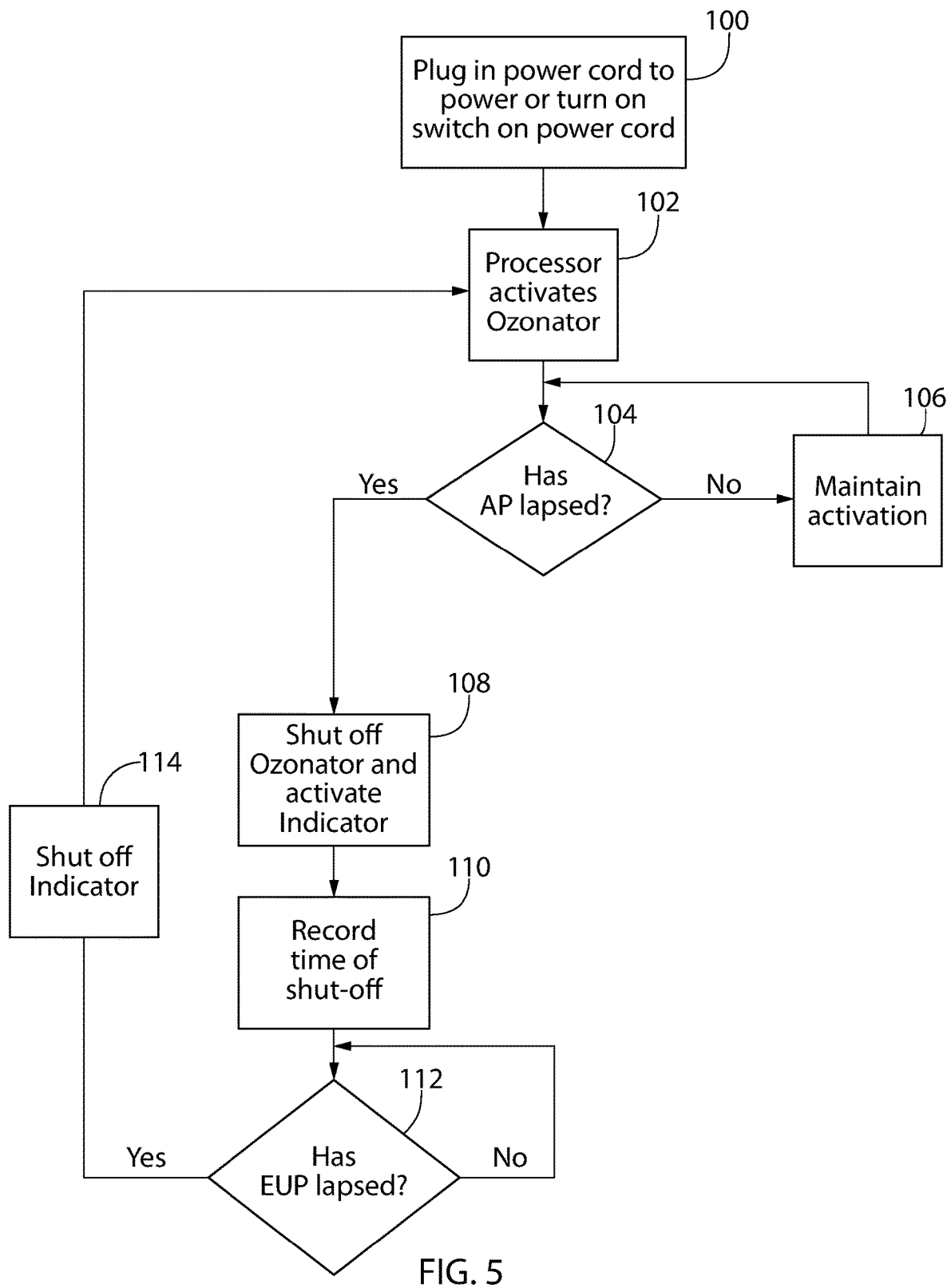
FIG. 5 is a flow diagram of the microprocessor operation in the electronics.

FIG. 5 depicts the microprocessor 28D operation with the bottle portion 10B filled and the insert assembly 20 installed and the spray head 10A installed. Once the power cord 28 is plugged into the connector 22C (step 100), the microprocessor 28D turns on the ozonator element 24 (step 102) and monitors the AP to determine if the AP has elapsed (step 104) or not (step 106). If the AP has elapsed, the microprocessor 28D shuts off the ozonator element 24 by opening the switch 28E and turns on the indicator 28F (step 108). The lighted indicator 28F lets the user know that he/she has a fully ozonated cleaning product ready for use. The microprocessor 28D notes the timestamp of the shut-off of the ozonator element 24 (step 110). The microprocessor 28D then monitors how much time has elapsed since the shut-off timestamp (step 112) to determine if the predetermined EUP has lapsed. If it has, the microprocessor 28D shuts of the indicator 28F (step 114) and immediately activates the ozonator element 24 (step 102) to re-ozonate the water L. As a result, this process guarantees that if a spray bottle 10 with the insert assembly 20 installed therein is plugged into wall power and no one has used the spray bottle, the water L is automatically re-ozonated after every EUP has lapsed.

Figure 5A:
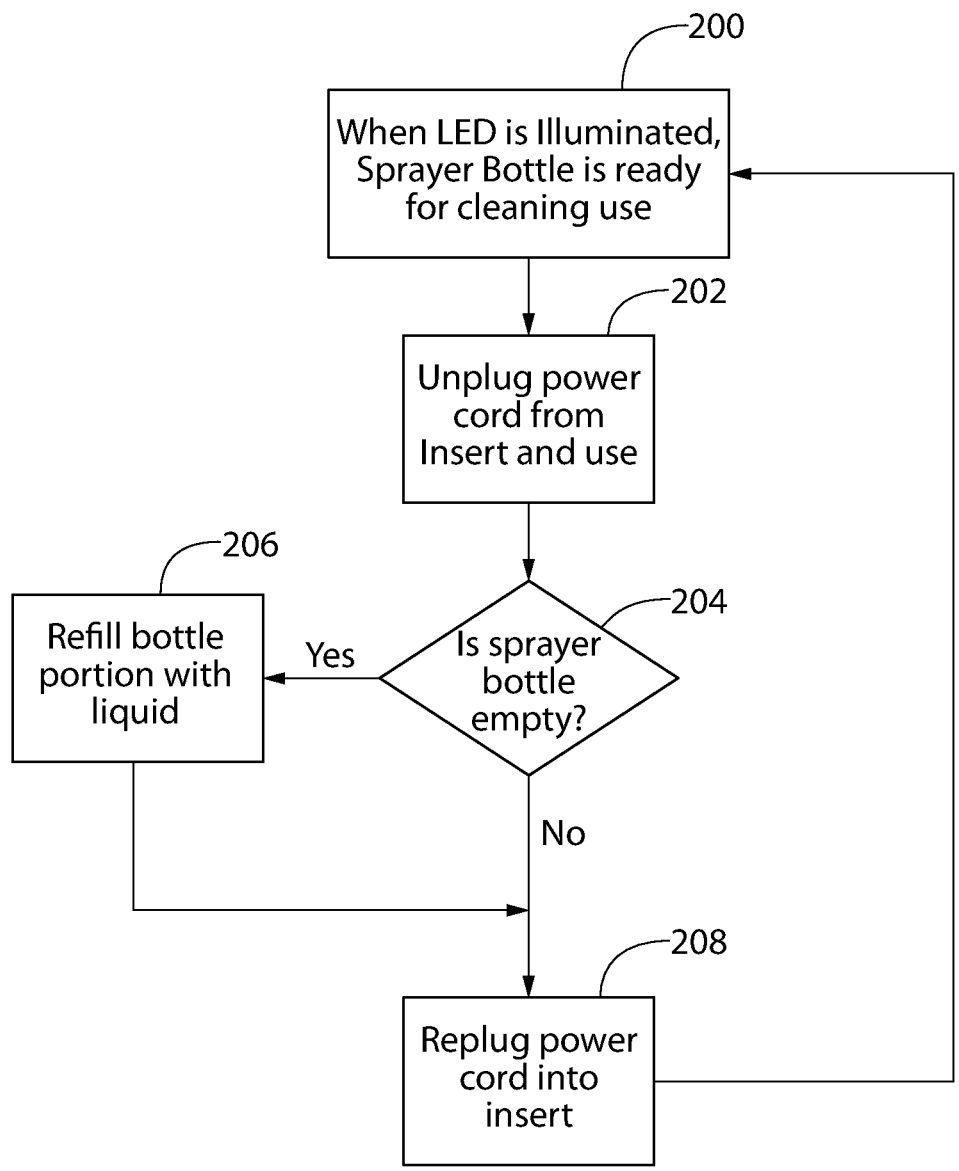
FIG. 5A is a flow diagram of the process of using the present invention in a conventional spray bottle.

FIG. 5A provides a flow diagram of the use of the spray bottle 10 with the insert assembly 20 installed therein and powered as describe above. With the indicator 28F illuminated (step 200), the user unplugs the power cord (step 202) by disengaging the USB connector 28B from the insert connector 22C. The user can now use the spray bottle 10 to clean. If the user empties the bottle portion 10B (step 204), the user will refill the bottle portion 10B (step 206) and then reconnect the power cord to the insert member 22 (step 208). Should the user not empty the bottle 10 and reconnects the power cord to the insert member 22, the microprocessor 28D will re-ozonate the remaining water L in the bottle portion 10B, even if the EUP has not lapsed; there is no concern in "re-ozonating" water L that is still within the EUP.

Figure 6:
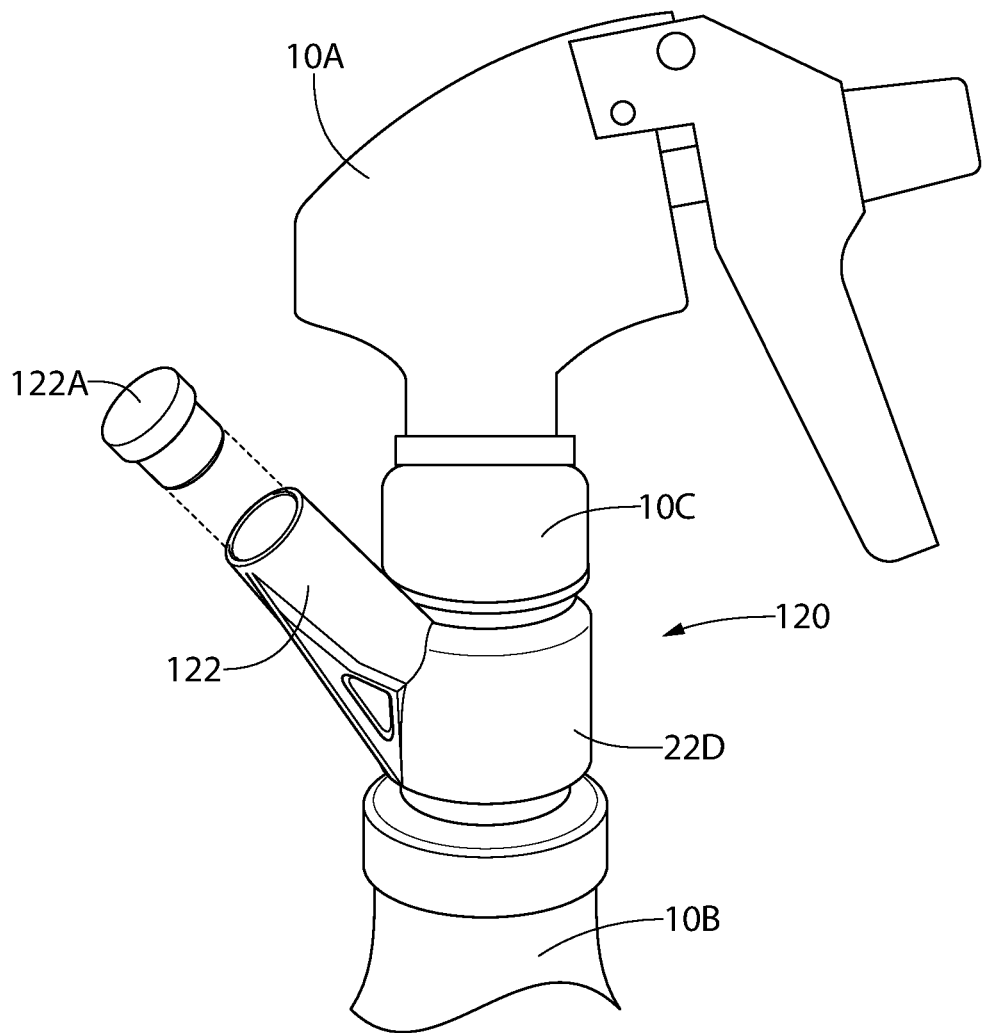
FIG. 6 is a partial view of an alternative insert member of the present invention which includes a spout and corresponding closure shown in an exploded condition.
Figure 7:
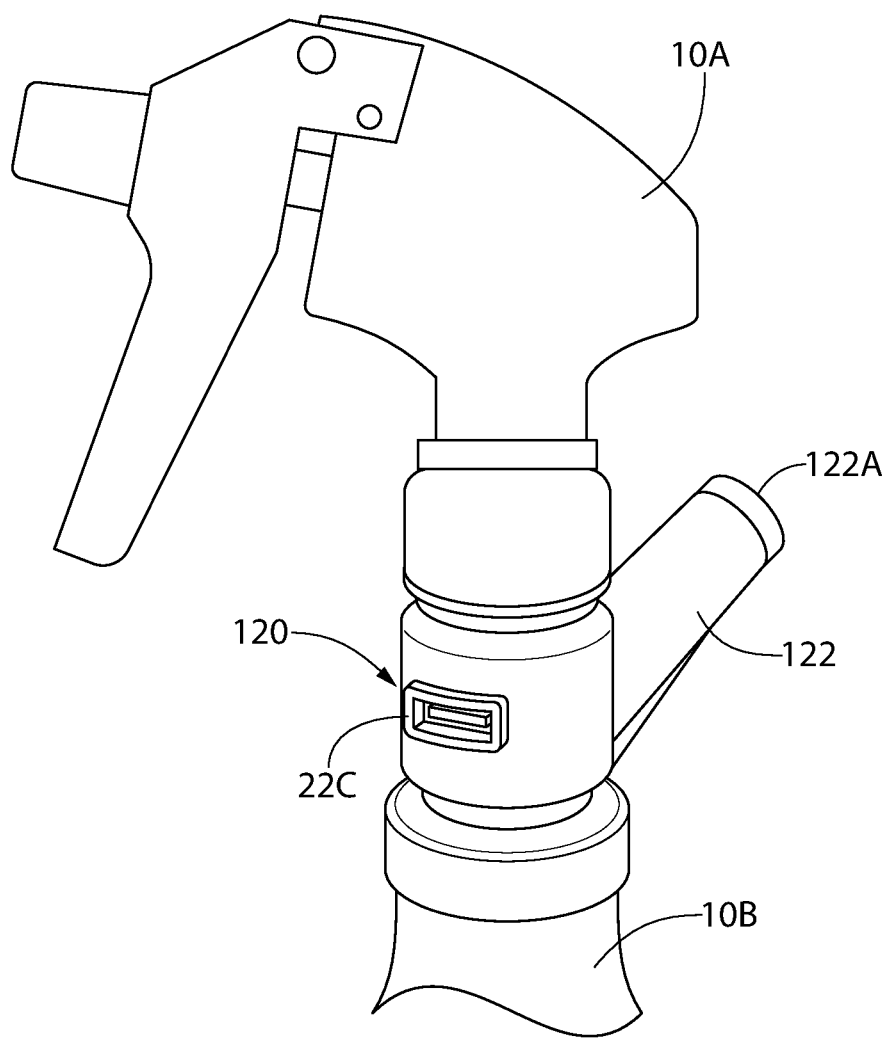
FIG. 7 is a partial back view of the alternative insert member of FIG. 6.

To make the use of the insert assembly even more convenient, an alternative insert assembly 120 is shown in FIGS. 6-7. The alternative insert assembly 120 is identical to the insert assembly 20 but includes a refill spout 122 with an associated removable closure 122A. As discussed above, when the ozonated water L is emptied from the bottle 10B in step 206, the user needs to refill the bottle portion 10B. Instead of having to disengage the spray head 10A or the insert assembly 22 from the bottle portion 10B, the user can simply remove the closure 122A (e.g., a cap), pour in more water L and then reinstall the closure 122A. The user then inserts the power cord 28 to the connector 22C in the insert member 120 and the process of FIG. 5 is carried out.

It should be noted that the use of USB connectors is simply by way of example and that it is within the broadest scope of the invention 20/120 to include all types of electrical connectors for powering the ozonator element 24 and controlling its energization. Furthermore, it is within the broadest scope of the invention to include the controller 28A on the insert member 22 itself, rather than in the power cord 28. Moreover, it is also within the broadest scope of the invention 20/120 to utilize a replaceable battery or a rechargeable battery on or within the insert assembly 20/120.

A key aspect to this invention 20/120 is that power to the ozonator element 24 is being provided from the insert member 22 either from an external power source (e.g., a wall outlet, etc.) or from an on-board power source (e.g., a replaceable battery or a rechargeable battery, etc.) associated with the insert member 20/120. Furthermore, where the controller 28A itself is located within or on the insert member 22, an exemplary module such the DROK Time Delay Relay DC 5V-12V-24V Delay Controller Board Delay-Off Cycle Timer board may be used.

It is also within the broadest scope of the present invention to include a user interface with the controller 28A that would permit the user to adjust the AP based on the purity of the water being used in the sprayer bottle 10, as well as being able to adjust the EUP to ensure that ozonated water is always present in the sprayer bottle 10.

It is also within the broadest scope of the present invention 20 to provide an alternative use of the ozonated water within the sprayer bottle: a potable water source, especially in emergencies. The ozonated water in the sprayer bottle 10 can also act as potable water, in addition to the primary use of the ozonated water as cleaning agent.

Figure 8:
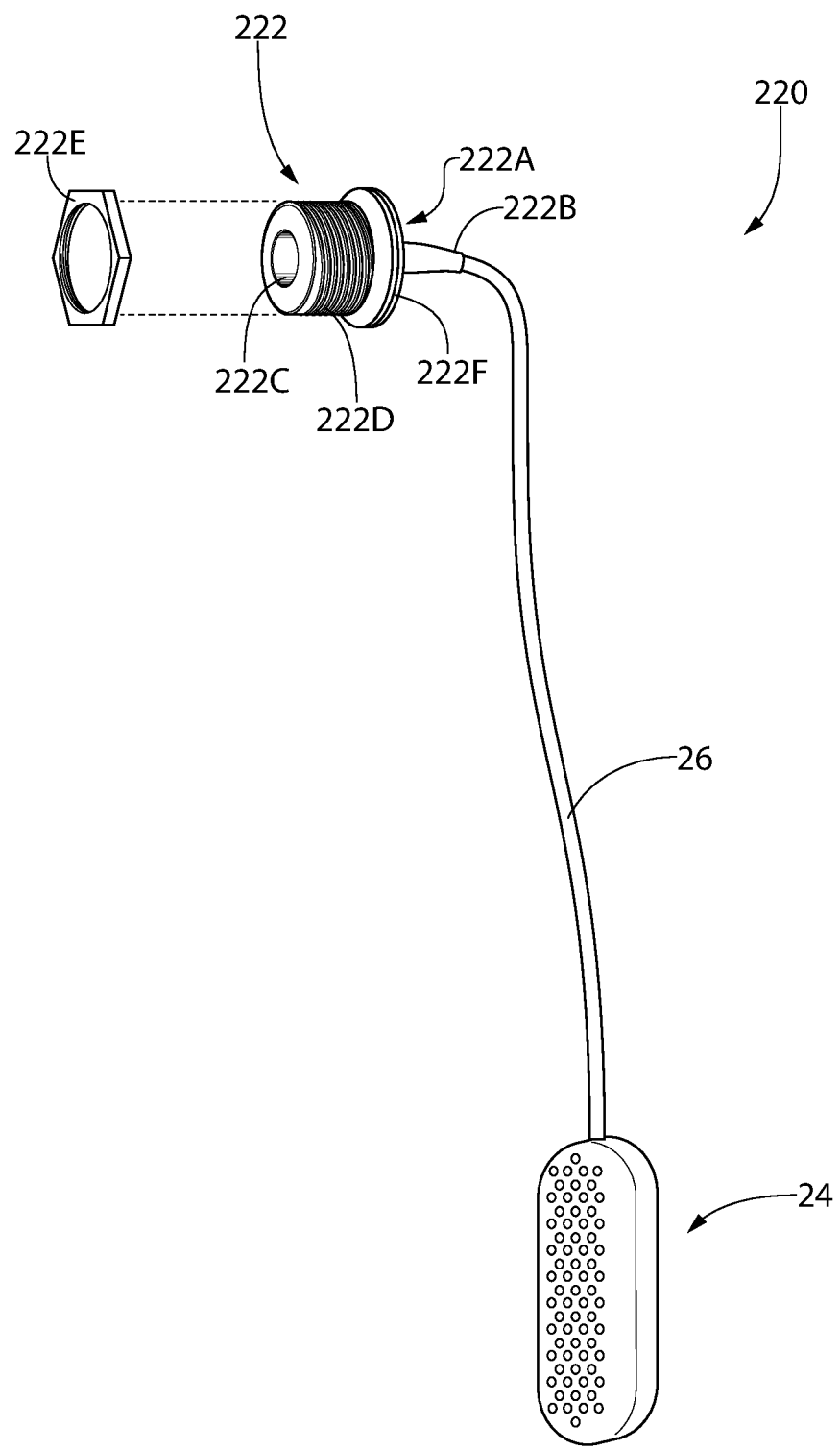
FIG. 8 shows an alternative apparatus for modifying a sprayer bottle into an ozonating sprayer bottle.

FIGS. 8-11 depict an alternative apparatus 220 for converting a conventional sprayer bottle 10 into an ozonating sprayer bottle. In general, rather than installing the insert 22 between the sprayer head 10A and the bottle portion 10B as described above, in the alternative apparatus 220, the ozonator element 24/electrical cable 26 have an electrical connector 222 coupled to the other end of the cable 26 which is installed into the wall itself of the bottle portion 10B. As shown in FIG. 8, the alternative apparatus 220 comprises the ozonator element 24 coupled to one end of the electrical cable 26. The other end of the electrical cable 26 is coupled (e.g., soldered) to one side 222A of the electrical connector 222 which is then covered with a shrink wrap 222B. The opposite side of the connector 222 comprises an electrical receptacle 222C surrounded by a screw thread 222D having a corresponding nut 222E. A shoulder 222F provides a flange against which the connector 222 is able to seat against the internal wall of the bottle portion 10B, as described next.

Figure 9:
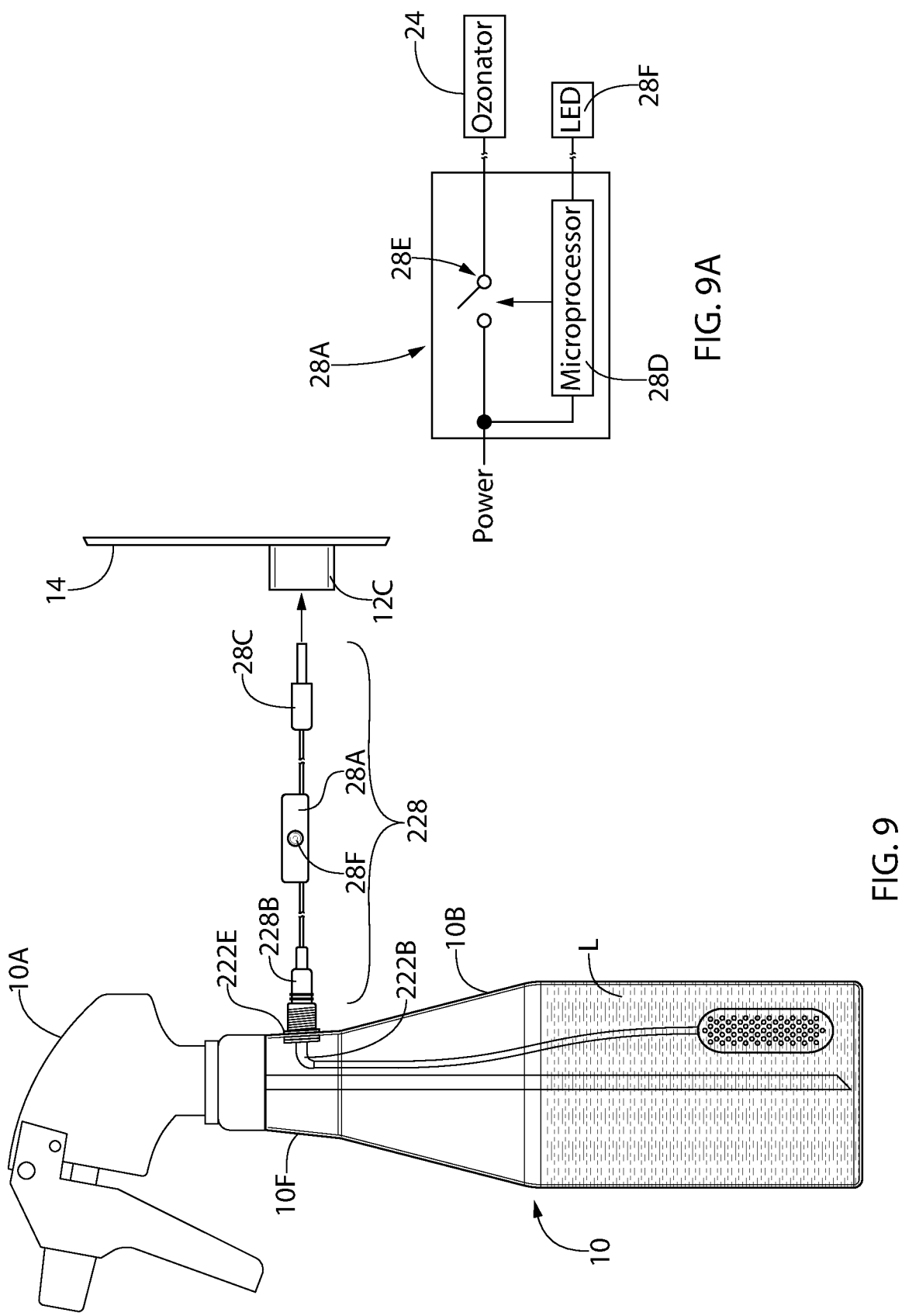
FIG. 9 depicts the alternative apparatus of claim 8 installed in a conventional spray bottle with a power cord coupled to the alternative apparatus for energizing the ozonator element.
Figure 10:
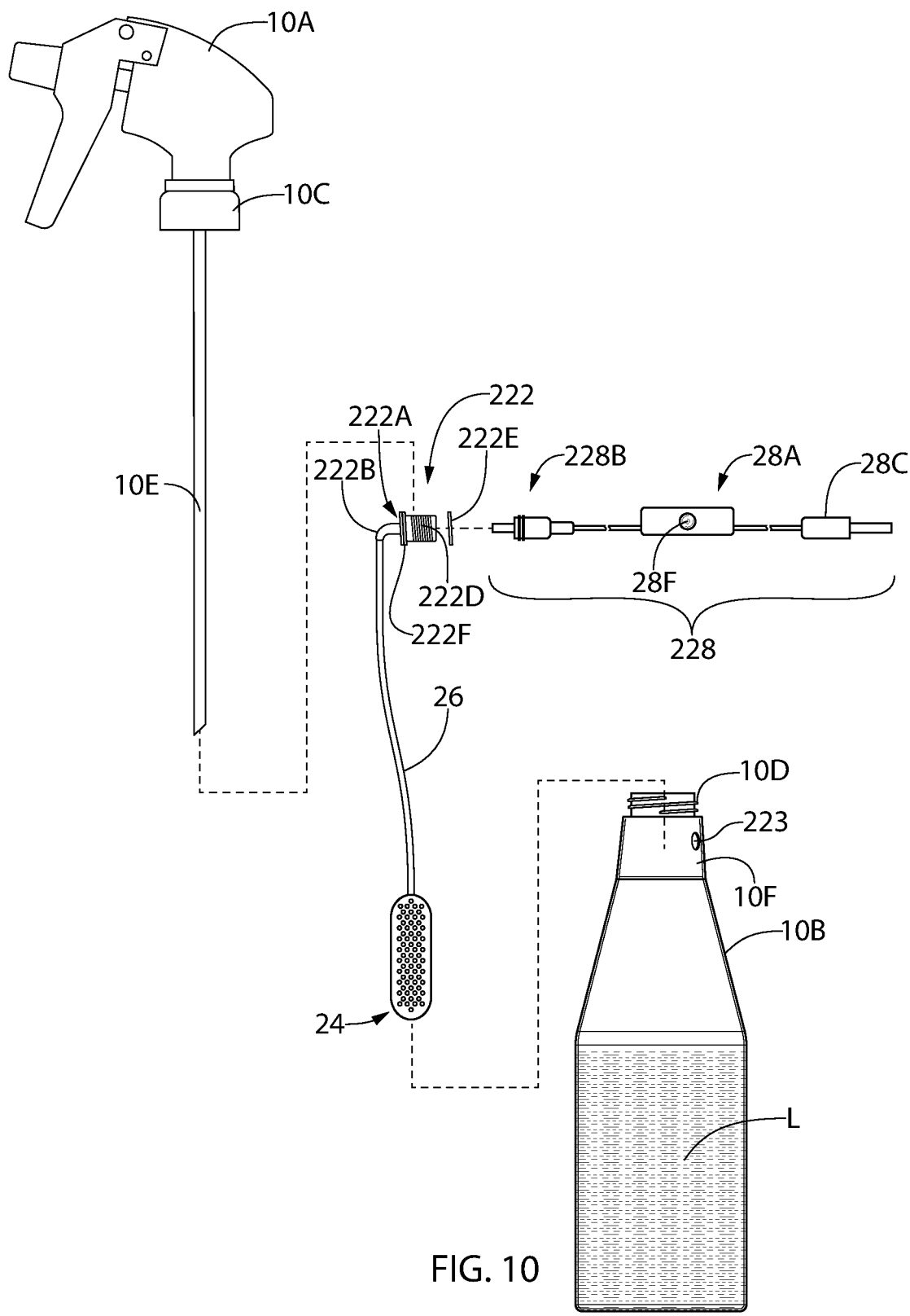
FIG. 10 is an exploded view of the alternative apparatus installed in a conventional spray bottle along with the power cord.

In particular, a hole 223 (FIG. 10) is drilled through a sidewall 10F of the sprayer bottle 10; it is preferable to have a vertical sidewall in the bottle as shown in FIGS. 9-10, although the hole 223 could just as easily have be formed in the tapered portion 10B. By way of example only, the hole 223 may be a ¼ inch hole. Next, the ozonator element 24 and electrical cable 26 are placed down through the open end of the bottle portion 10B, along with the connector 222. The electrical receptacle 222C and the screw thread 222D are then pushed through the hole 223 until the shoulder 222F is positioned against the inner side of the sidewall 10F and the nut 222E is threaded on the screw thread 222D and then tightened against the sidewall 10F, thereby releasably securing the connector 222 to the sidewall 10F. The stainless steel composition of the connector 222 prevents the connector 222 from rusting due to exposure to the water L and the shrink wrap 222B provides protection against rust as well against exposure of the soldered electrical connection to the water L also.

With the electrical connector 222 installed within the bottle sidewall 10F, the ozonator element 24 is ready for energization in the same manner as described for the insert 22. As described previously with regard to the insert 22, one of the key aspects of the alternative apparatus 220 is to provide a "ready-to-use" ozonated cleaning product in a conventional spray bottle 10. This is accomplished by electronics associated with the alternative apparatus 220. As shown most clearly in FIG. 10, a power cord 228 is also provided that includes the controller 28A, the USB connector 28C and a round DC power plug 228B that is received in the electrical receptacle 222C of the connector 222. As shown most clearly in FIG. 9A, the controller 28A comprises the microprocessor 28D (e.g., microcontroller such as Microchip ATTINY 4-MAHR etc.), the switch 28E (e.g., a solid-state switch, e.g., NPN, transistor, etc.) and the indicator 28F (e.g., a light-emitting diode (LED), e.g., a Cree Inc. C512A-WNN-CZ0B0151 LED). Operation of the microprocessor 28D is similar to the description above in accordance with FIG. 5.

Figure 11:
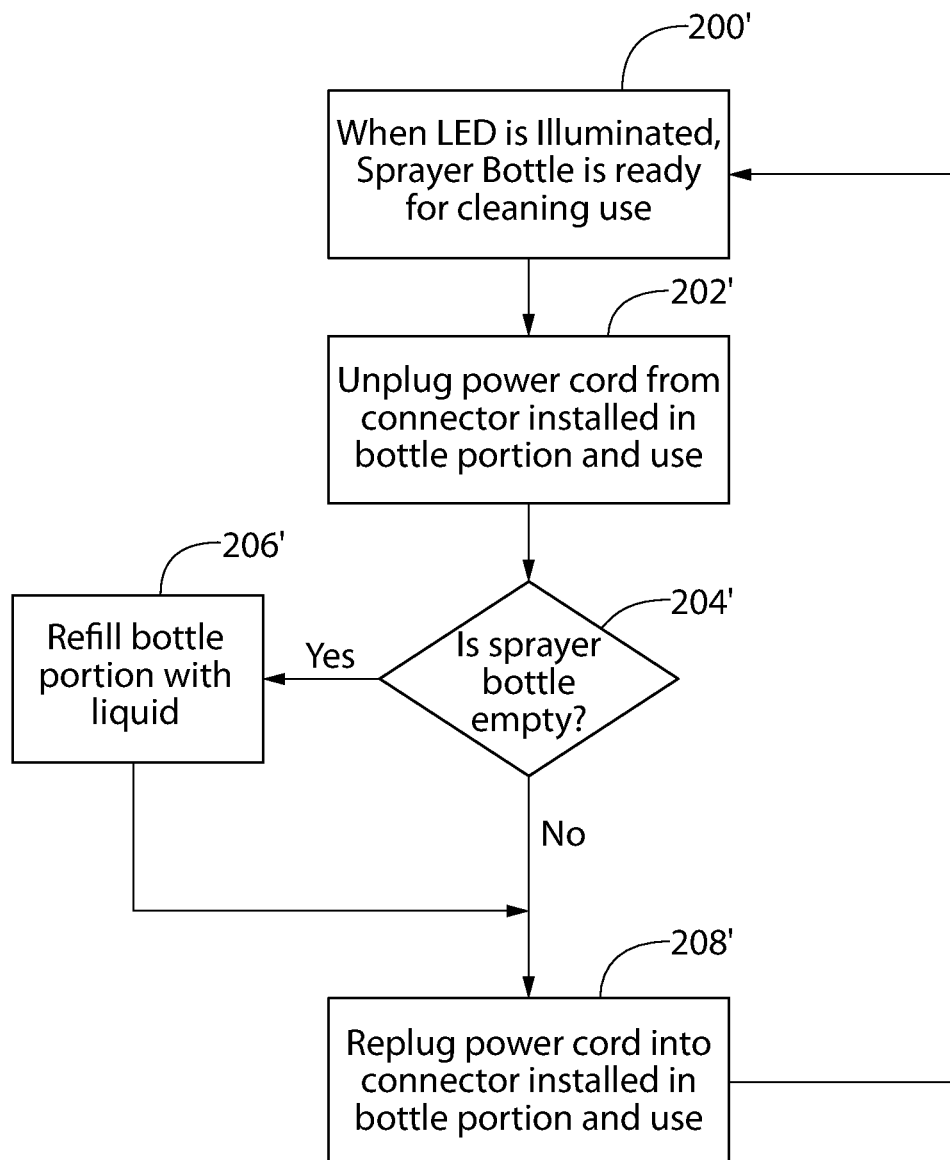
FIG. 11 is a flow diagram of the process of using the alternative in a conventional spray bottle.

FIG. 11 provides a flow diagram of the use of the spray bottle 10 using the alternative apparatus 220 and powered as describe above. With the indicator 28F illuminated (step 200'), the user unplugs the power cord (step 202') by disengaging the DC power plug 228B from the connector 222. The user can now use the spray bottle 10 to clean. If the user empties the bottle portion 10B (step 204'), the user will refill the bottle portion 10B (step 206') and then reconnect the power cord to the connector 222 (step 208'). Should the user not empty the bottle 10 and reconnects the power cord to the connector 222, the microprocessor 28D will re-ozonate the remaining water L in the bottle portion 10B, even if the EUP has not lapsed; there is no concern in "re-ozonating" water L that is still within the EUP.

As can be appreciated, the alternative apparatus 220 provides another alternative to using the insert 22. The alternative apparatus 220 can be easily installed by a user by simply drilling the hole 223 in the sidewall 10F of the bottle portion 10B of the sprayer bottle 10B, positioning the ozonator element 24/electrical cable 26 down into the bottle portion 10B, inserting the screw threads 222D through the hole 223 and then using the screw threads 222D/nut 222E to lock the connector 222 into the sidewall 10F of the bottle portion 10B. Once installed, the alternative apparatus 220 operates identically as the insert 20. Another advantage of the alternative apparatus 220 is that it can be used for modifying any sprayer bottle 10 since there is no need to couple the connector 222 to the threaded opening 10D of the sprayer bottle; rather, the connector 222 is simply installed into the sprayer bottle sidewall 10F.

It should be noted that the use of DC power plug 228C/connector 222 is simply by way of example and that it is within the broadest scope of the invention 220 to include all types of electrical connectors for powering the ozonator element 24 and controlling its energization.

As with the insert 20, it is also within the broadest scope of the alternative apparatus 220 to include a user interface with the controller 28A that would permit the user to adjust the AP based on the purity of the water being used in the sprayer bottle 10, as well as being able to adjust the EUP to ensure that ozonated water is always present in the sprayer bottle 10.

It is also within the broadest scope of the alternative apparatus 220 to provide an alternative use of the ozonated water within the sprayer bottle: a potable water source, especially in emergencies. The ozonated water in the sprayer bottle 10 can also act as potable water, in addition to the primary use of the ozonated water as cleaning agent.

Figure 12:
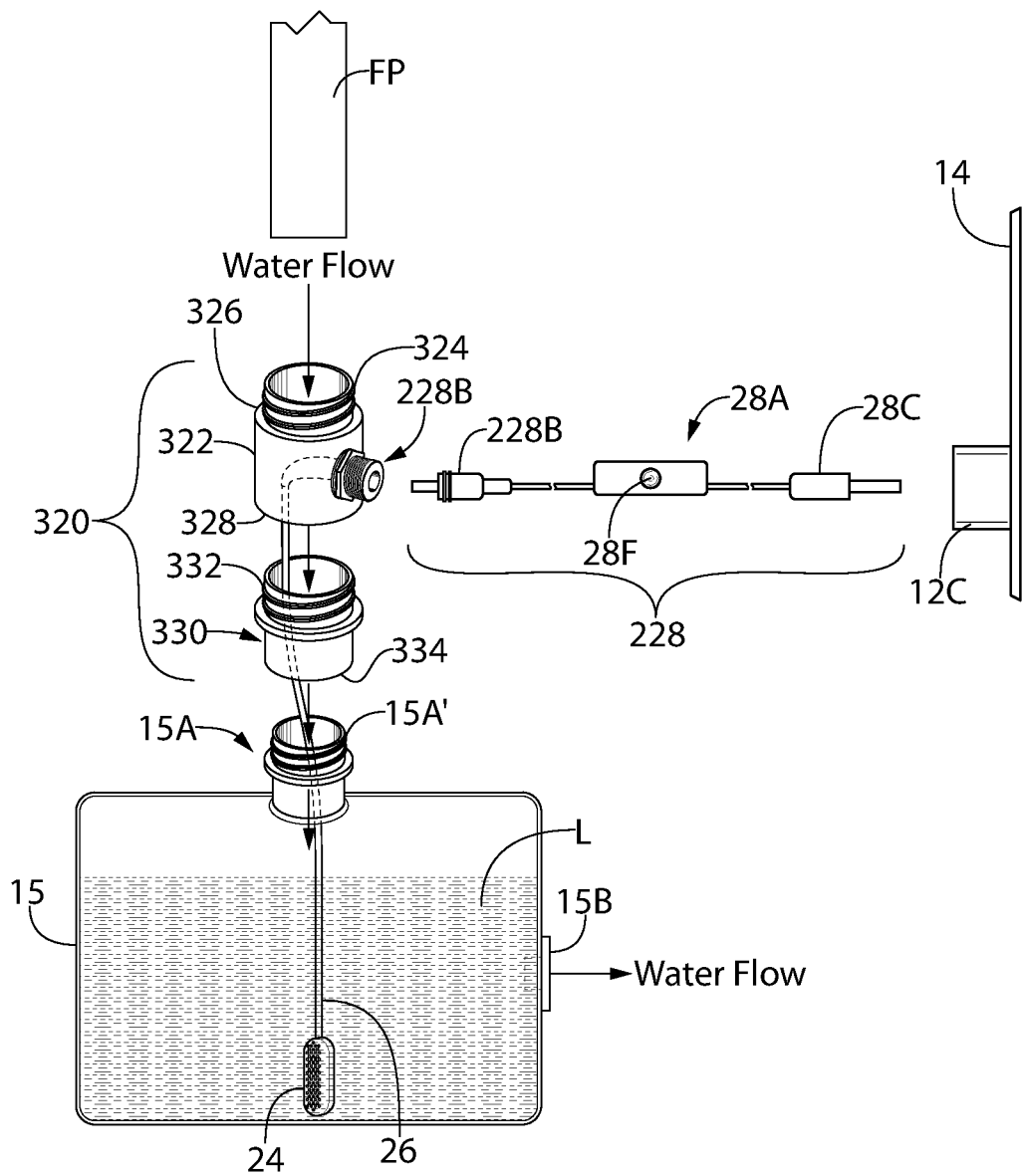
FIG. 12 is a functional diagram of an inventive coupler for modifying a water reservoir into an ozonating water reservoir.

FIG. 12 depicts a variation of the insert 22 for use with water reservoirs (e.g., tanks, accumulators, etc.) to make them ozonating water reservoirs. This can be especially useful for establishing potable drinking water sources quickly where critical drinking water needs arise, such as natural disasters (e.g., hurricanes, tornados, earthquakes, extreme temperature changes, etc.) or other emergencies. A conventional water reservoir 15 comprises an input 15A, for receiving water from a water source (not shown) and an output 15B, for delivering water to a process (also not shown), e.g., a potable water source, a cleaning station, etc. A feedpipe FP to the reservoir 15 may comprise a female coupling that couples to the reservoir's input 15A, e.g., a male threaded connector.

To modify the water reservoir into an ozonating water reservoir, an inventive coupler 320 is provided, as shown in FIG. 12. The coupler 320 comprises a hollow housing 322 in which the electrical connector 222 is installed, as discussed previously with regard to the alternative apparatus 220. The hollow housing 322 comprises a male threaded portion 324 (e.g., 45/400 male thread) on a first end 326 that couples to the feedpipe FP, and further comprises a second end 328, opposite the first end 326, which includes an internal female threaded portion (e.g., 45/400 female thread). The internal female threaded portion of the housing 322 connects to a hollow adapter 330 via upper male threads 332 on the adapter 330. The adapter 330 includes a lower end 334 that includes an internal female threaded portion for coupling to the male threaded portion 15A' of the reservoir input 15A.

Use of the inventive coupler 320 is as follows. The feedpipe FP is disconnected from the reservoir input 15A. The user has two options for configuring the water reservoir 15 to become an ozonating water reservoir.

The first option has the user connecting the adapter 330 to the reservoir input 15A, feeding the ozonating element 24/electrical cable 26 through the adapter 330 and then down into the water reservoir 15, then connecting the housing 322 to the top of the adapter 330 and then connecting the feedpipe FP to the top of the housing 332.

The second option has the user first feed the ozonating element 24/electrical cable 26 through the adapter 330 and then connecting the adapter 330 to the bottom of the housing 322. The user then feeds the ozonating element 24/electrical cable 26 down through the reservoir input 15A and into reservoir 15. Next, the user then connects the lower end 334 of the adapter 330 to the reservoir input 15A. The user completes the process by connecting the feedpipe FP to the top of the housing 322.

The inventive coupler 320 is now ready to be activated by connecting the DC power plug 228C to the connector 222 via the power cord 228. Operation of the inventive coupler 320 to have the water reservoir 15 generate a source of ozonated water is similar to the previous discussion for FIGS. 5 and 11. However, since the water reservoir 15 is typically always connected to the feedpipe FP, the reservoir 15 is thus usually filled with water; as such, steps 202' 204, 206' and 208' of FIG. 11 are not required. If, on the other hand, the water reservoir 15 is portable, then those steps of FIG. 11 apply.

Moreover, it should be understood that in view of the foregoing, different adapters 330 having respective internal female threads on the lower end 334 of the adapter 330 may be provided for coupling to differently sized water reservoir input connectors 15A.

It should be noted that the use of DC power plug 228C/connector 222 is simply by way of example and that it is within the broadest scope of the invention 220 to include all types of electrical connectors for powering the ozonator element 24 and controlling its energization.

As with the insert 20/alternative apparatus 220, it is also within the broadest scope of the inventive coupler 320 to include a user interface with the controller 28A that would permit the user to adjust the AP based on the purity of the water being used in the water reservoir 15, as well as being able to adjust the EUP to ensure that ozonated water is always present in the water reservoir 15. The ability to adjust the AP and EUP is also important depending of the size of the water reservoir 15 where the volume of water therein may require that the AP and EUP be adjusted accordingly.

Because the inventive coupler 320 allows a water reservoir 15 to ozonate the water therein, the ozonated water therein can be used as potable water or as a cleaning agent, as discussed previously with the regard to the insert 20 and the alternative apparatus 220.

While the invention has been described in detail and with reference to specific examples thereof, it will be apparent to one skilled in the art that various changes and modifications can be made therein without departing from the spirit and scope thereof.

What is claimed is:

1. An apparatus for permitting water in a reservoir to be ozonated within the reservoir, the reservoir having an input connector coupled to a feedline and an output, said apparatus comprising:
a coupler that can be releasably coupled between the feedline and the input connector, said coupler comprising an electrical connector positioned in an aperture in a sidewall of said coupler;
an ozonator element that is coupled to said electrical connector via an electrical cable and wherein said ozonator element is configured to be submerged within water contained within the reservoir; and
wherein said electrical connector conveys electrical power to said ozonator element to activate said ozonator element to ozonate the water contained with the reservoir.

2. The apparatus of claim 1 wherein said electrical connector comprises a threaded portion with a shoulder and a corresponding nut, said shoulder being positioned against an internal side of the sidewall with said threaded portion protruding outward from the sidewall and wherein said nut is threadedly engaged with said threaded portion and in contact with an external side of the sidewall for releasably securing said electrical connector to the sidewall.

3. The apparatus of claim 1 wherein said electrical connector configured for receiving a power cord from an external power source for providing the electrical power to said ozonator element.

4. The apparatus of claim 3 further comprising a controller that provides the electrical power to said ozonator element for a predetermined activation period to form the ozonated water.

5. The apparatus of claim 4 further comprising an indicator coupled to said controller, said controller illuminating said indicator when said predetermined activation period is concluded.

6. The apparatus of claim 4 wherein said predetermined activation period is two minutes.

7. The apparatus of claim 4 wherein said controller tracks a time elapsed since said predetermined activation period has terminated, thereby defining an effective use period of said ozonated water, after which said controller applies electrical power to said ozonator element for said predetermined activation period.

8. The apparatus of claim 7 wherein said effective use period comprises two hours.

9. The apparatus of claim 1 wherein said ozonated water contained within the reservoir is used as a cleaning agent.

10. The apparatus of claim 1 wherein said ozonated water contained within the reservoir is used as potable water.

* * * * *